United States Patent

Sherman et al.

(10) Patent No.: US 9,070,109 B2
(45) Date of Patent: Jun. 30, 2015

(54) DYNAMIC PRESENTATION OF A USER PROFILE

(75) Inventors: Yahali Sherman, Tel Aviv (IL); Vitaly Vainer, Kfar Saba (IL)

(73) Assignee: SAP Portals Israel Ltd, Ra'anana (IL)

(*) Notice: Subject to any disclaimer, the term of this patent is extended or adjusted under 35 U.S.C. 154(b) by 267 days.

(21) Appl. No.: 13/545,755

(22) Filed: Jul. 10, 2012

(65) Prior Publication Data

US 2014/0019533 A1 Jan. 16, 2014

(51) Int. Cl.
*G06F 15/16* (2006.01)
*G06Q 10/10* (2012.01)
*H04L 12/58* (2006.01)
*H04L 29/08* (2006.01)
*G06Q 50/00* (2012.01)

(52) U.S. Cl.
CPC ............... *G06Q 10/10* (2013.01); *H04L 51/00* (2013.01); *H04L 67/24* (2013.01); *H04L 51/22* (2013.01); *H04L 51/32* (2013.01); *G06Q 50/01* (2013.01)

(58) Field of Classification Search
CPC ....... G06F 9/4451; H04L 51/22; H04L 51/32; H04L 51/043; H04L 51/00; G06Q 10/10; G06Q 10/01

USPC ......................................................... 709/204
See application file for complete search history.

(56) References Cited

U.S. PATENT DOCUMENTS

| | | | |
|---|---|---|---|
| 2004/0128322 A1* | 7/2004 | Nagy .......................... | 707/104.1 |
| 2010/0144318 A1* | 6/2010 | Cable .......................... | 455/412.1 |
| 2011/0088046 A1 | 4/2011 | Guertler et al. | |
| 2011/0137909 A1 | 6/2011 | Guertler et al. | |
| 2011/0231592 A1 | 9/2011 | Bleier et al. | |
| 2012/0041922 A1 | 2/2012 | Vainer et al. | |

* cited by examiner

*Primary Examiner* — Yves Dalencourt
(74) *Attorney, Agent, or Firm* — Fish & Richardson P.C.

(57) ABSTRACT

Systems and methods for dynamic user profile presentation in a large-scale network are provided. Individuals may request to retrieve user profiles of other users in the network. Commonalities between the requesting individual and the owner of the user profile are identified. The commonalities may include non-public information associated with the owner of the user profile. Connection strength associated with each commonality is determined and the commonalities are prioritized according to the connection strength. The commonalities between the requesting individual and the owner of the user profile are presented to the requesting individual based on the prioritization.

24 Claims, 5 Drawing Sheets

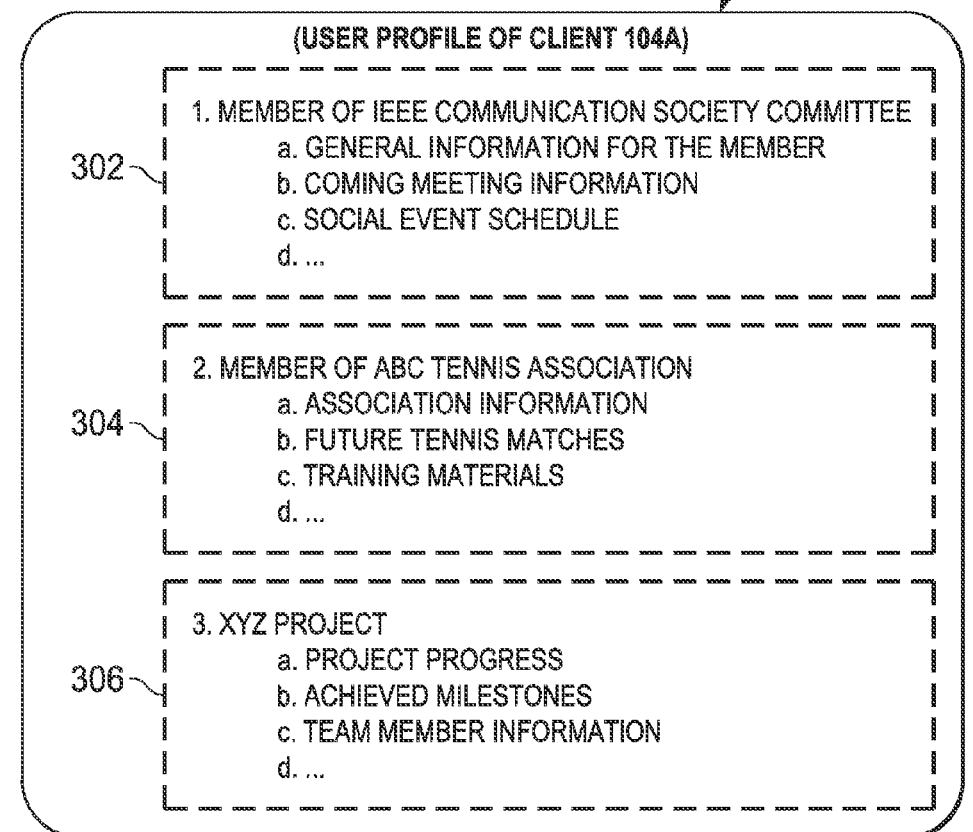
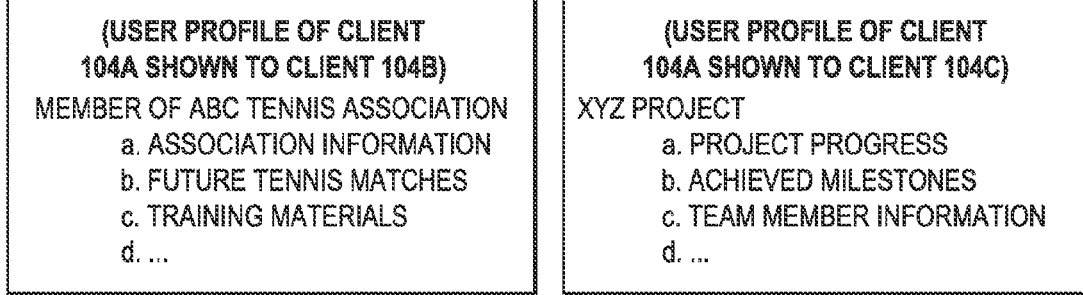
FIG. 3

DYNAMIC PRESENTATION OF A USER PROFILE

TECHNICAL FIELD

This disclosure relates to dynamic presentation of a user profile in a large-scale complex network, e.g., social networks, and more particularly, to presenting user profile information according to the strength of commonalities among the users.

BACKGROUND

Social networks provide web-based services that allow users of a particular network to connect and interact with other users of the network. Typically, social networks can be categorized into one of two categories: public social networks, or enterprise social networks. A user in the network may choose to share information about himself or herself with other users through a user profile. For enterprise social networks, a user may further be able to share work related information through a user profile, such as meetings, projects or other professional activities in which the user is participating, etc.

SUMMARY

One or more aspects of the present disclosure pertain to systems, methods, and computer program products for dynamic user profile presentation. A request may be received from a first user to view profile information of a second user. Commonalities may be identified between the first user and the second user. The commonalities may be provided to the first user.

In some implementations, the profile information of the second user is stored in a memory.

Certain aspects may also include retrieving the profile information of the second user from the memory. The retrieved information may be displayed to the first user.

In some implementations, wherein the commonalities between the first and second user include one or more of common social connections, common user property, common interests, and common activities.

Certain aspects may also include determining connection strength associated with the identified commonalities. The commonalities may be prioritized according to the associated connection strength.

In some implementations, determining connection strength is calculated based on a plurality of parameters associated with the identified commonalities, and the plurality of parameters include one or more of a number of other users possessing same commonalities, occurrence dates of the commonalities, and importance of the commonalities.

In some implementations, the connection strength is an indicator of the interaction frequency between the first user and the second user resulting from the associated commonality.

Certain aspects may also include providing the commonalities to the first user based on the prioritization of the commonalities.

Certain aspects may also include automatically setting permissions for the first user to access profile information of the second user, based on the identified commonalities.

Certain aspects may also include gathering additional information of the second user from sources other than a user profile database. The additional information can be provided to the first user.

In some implementations, the commonalities include non-public information, which is accessible to a selected group of users.

Certain aspects may also include receiving requests from a plurality of users for profile information of the second user. Commonalities between each of the plurality of users and the second user can be identified. The commonalities between each of the plurality of users and the second user can be provided to each of the plurality of users, respectively.

The details of one or more embodiments of the disclosure are set forth in the accompanying drawings and the description below. Other features, objects, and advantages of the disclosure will be apparent from the description and drawings, and from the claims.

DESCRIPTION OF DRAWINGS

FIG. 3 is an example of a user profile presentation organized according to commonalities among the users.

Like reference symbols in the various drawings indicate like elements.

DETAILED DESCRIPTION

The present disclosure pertains to systems, methods, and computer program products for providing a dynamic presentation of a user profile based on identified commonalities among the users in a large-scale complex network (e.g., business networks, social networks, etc.). Information related to a user is presented dynamically to other users with respect to common social connection and user properties between the user and the requesting individual, which are referred to as commonalities in this disclosure. The present disclosure may be applied in a business network, social network, or any other type of large scale-complex network.

Figure 1:
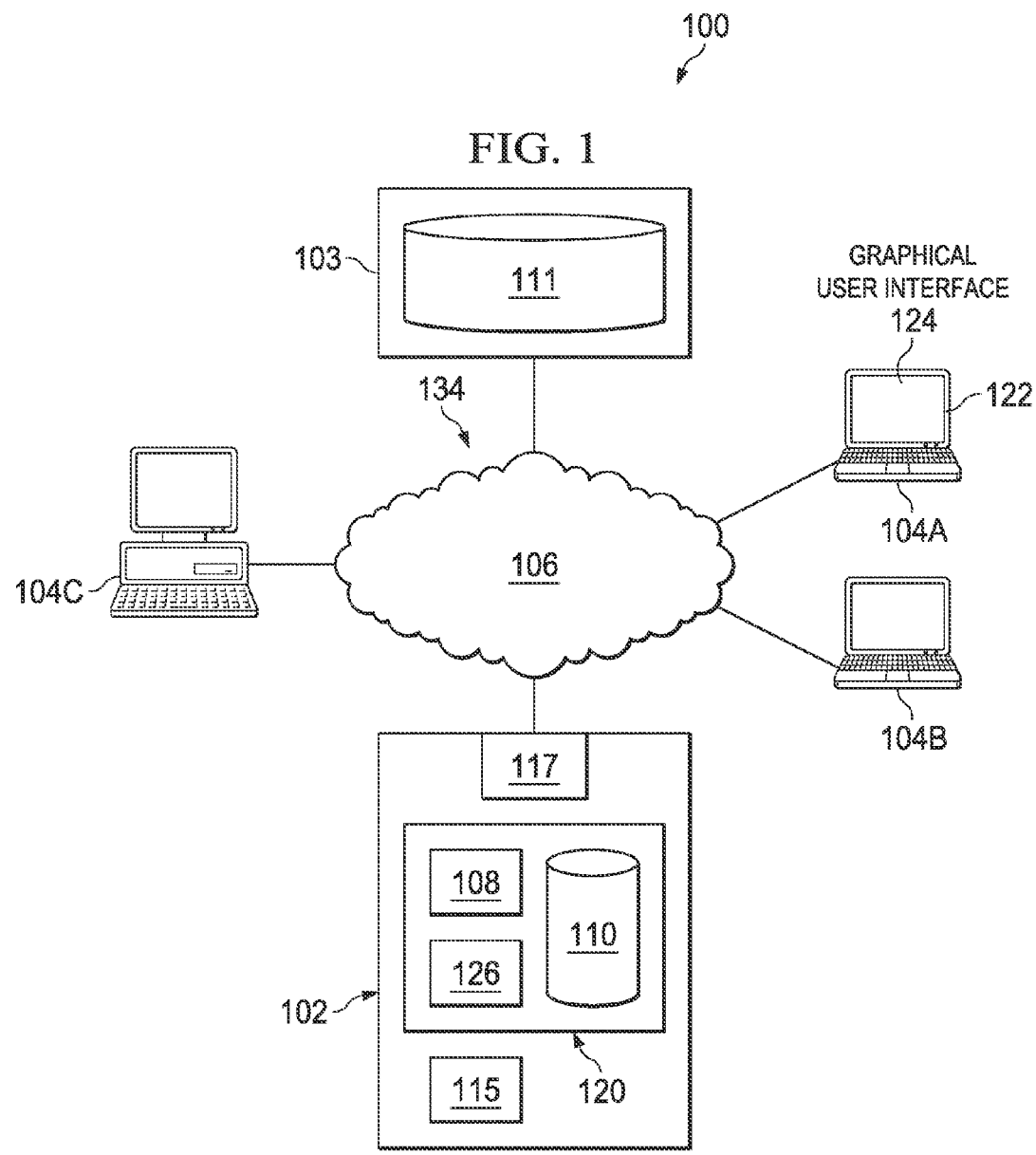
FIG. 1 is a block diagram of an example system for providing a dynamic user profile presentation.

FIG. 1 illustrates an example system 100 for providing dynamic user profile presentations. System 100 includes a server 102, and a client 104A. The server 102 and client 104A communicate across a network 106.

Server 102 includes a processor 120. Processor 120 executes requests from individuals of the network to retrieve user profile information. Processor 120 can be, for example, a central processing unit (CPU), a blade, an application specific integrated circuit (ASIC), or a field-programmable gate array (FPGA), or other type of processor. Although FIG. 1 illustrates a single processor 120 in server 102, multiple processors may be used according to particular needs, and reference to processor 120 is meant to include multiple processors where applicable. In the illustrated embodiment, processor 120 executes profile processing module 126 and a rendering engine 108.

Profile processing module 126 processes a received viewing request to retrieve a user profile. The profile processing module 126 may make use of user profile data stored in memory 110. The profile processing module 126 may also retrieve user profile data from profile database 115. The profile processing module 126 compares the requested user profile data and the requesting user profile data, and identifies commonalities and the strength of commonalities between the user and the individual requesting the user profile. The profile processing module 126 may further prioritize and organize the requested user profile data based on the identified strength of commonalities. The profile processing module 126 may also automatically set access permission of the requesting individual with regard to the requested user profile, based on the identified commonalities and their strength.

Profile database 115 is configured to store user profile information associated with each of the users of the social network. In some implementation of the enterprise social network, the profile database 115 may also store user information that is generated and used outside of the context of the social network, such as documents and meeting reports that are associated with the user in the workspace.

Processor 120 may also execute a rendering engine 108 on the server 102. Rendering engine 108 renders a visualization of large-scale complex networks as a graph that takes into account priority, frequency, relevancy, and group association. The rendering engine 108 makes use of data stored in memory 110 or received across network 106 from, for example, a server 103 associated with social or business networking websites, employers, gaming networks, blogs or other subscription sites, or other locations where information pertaining to network associations is kept. The server 103 includes a memory 111. The rendering engine 108 may keep track of navigation history to enhance the browsing experience throughout different networks, for example, by allowing the user to go back and forth between recently viewed social network representations. The rendering engine 108 may customize the visual representation using provided scores and/or ratings for social entities, hiding/showing specific nodes that will be persisted for future view rendering for the logged-in user, and/or switching between available social network data relevant for the viewed entity.

Server 102 may be any computer or processing device such as a mainframe, a blade server, general-purpose personal computer (PC), Macintosh®, workstation, UNIX-based computer, or any other suitable device. Generally, FIG. 1 provides merely one example of computers that may be used with the disclosure. In other words, the present disclosure contemplates computers other than general purpose computers, as well as computers without conventional operating systems. As used in this document, the term "computer" is intended to encompass a personal computer, workstation, network computer, mobile computing device, or any other suitable processing device. For example, although FIG. 1 illustrates one server 102 that may be used with the disclosure, system 100 can be implemented using computers other than servers, as well as a server pool. Server 102 may be adapted to execute any operating system including z/OS, Linux-Intel® or Linux/390, UNIX, Windows Server, or any other suitable operating system. According to one implementation, server 102 may also include or be communicably coupled with a web server and/or an SMTP server.

Server 102 may also include interface 117 for communicating with other computer systems, such as client 104A, over network 106 in a client-server environment or any other type of distributed environment. In certain implementations, server 102 receives requests for data access from local or remote senders through interface 117 for storage in memory 110 and/or processing by processor 120. Generally, interface 117 comprises logic encoded in software and/or hardware in a suitable combination and operable to communicate with network 106. More specifically, interface 117 may comprise software supporting one or more communication protocols associated with communications network 106 or hardware operable to communicate physical signals.

Memory 110 may include any memory or database module and may take the form of volatile or non-volatile memory including, without limitation, magnetic media, optical media, random access memory (RAM), read-only memory (ROM), removable media, or any other suitable local or remote and/or distributed memory and retrieved across a network, such as in a cloud-based computing environment.

Network 106 facilitates wireless or wireline communication between computer server 102 and any other local or remote computer, such as client 104A. Network 106 may be all or a portion of an enterprise or secured network. In another example, network 106 may be a VPN merely between server 102 and client 104A across a wireline or wireless link. Such an example wireless link may be via 802.11a, 802.11b, 802.11g, 802.11n, 802.20, WiMax, and many others. The wireless link may also be via cellular technologies such as 3GPP GSM, UMTS, LTE, etc. While illustrated as a single or continuous network, network 106 may be logically divided into various sub-nets or virtual networks without departing from the scope of this disclosure, so long as at least portion of network 106 may facilitate communications between senders and recipients of requests and results. In other words, network 106 encompasses any internal and/or external network, networks, sub-network, or combination thereof operable to facilitate communications between various computing components in system 100. Network 106 may communicate, for example, Internet Protocol (IP) packets, Frame Relay frames, Asynchronous Transfer Mode (ATM) cells, voice, video, data, and other suitable information between network addresses. Network 106 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 112 may be a secure network associated with the enterprise and remote clients 104A-C.

System 100 allows for a client, such as client 104A, to create a user profile containing information such as name, age, gender, location, occupation, interest, etc. System 100 may include more clients 104B and 104C. The server 102 and clients 104B-C communicate across a network 106. System 100 also includes clients 104A-C in communication with server 102 and other servers 103 across network 106.

When a user profile of client 104A is created, other users of the network, such as clients 104B and 104C, may submit a request to server 102 for access to the user profile of client 104A. Subsequently, clients 104B and 104C may obtain the associated information of client 104A by browsing the user profile of client 104A. Clients 104A-C may request for user profile information of other clients over network 106. Clients 104A-C may also store their user profile information in memory 110 or in profile database 115 associated with the server 102. Further, the user profile information may be stored on a remote and/or distributed memory and retrieved across a network, such as in a cloud-based computing environment. Clients 104A-C may also accept requests to share their user profile information with other clients.

It will be understood that there may be any number of clients 104A communicably coupled to server 102. This disclosure contemplates that many clients may use a computer or that one user may use multiple computers to submit or review queries via a graphical user interface (GUI) 124. As used in this disclosure, clients may operate remote devices, such as personal computers, touch screen terminals, workstations, network computers, kiosks, wireless data ports, wireless or wireline phones, personal data assistants (PDAs), one or more processors within these or other devices, or any other suitable processing device, to execute operations associated with business applications. For example, client 104A may be a PDA operable to wirelessly connect with an external or unsecured network. In another example, client 104A may comprise a laptop that includes an input device, such as a keypad, touch screen, mouse, or other device that can accept information, and an output device that conveys information associated with the operation of server 102 or client 104A, including digital data, visual information, or GUI 124. For example, rendering engine 108 may provide a graphic visualization of user profile data, which can be displayed to a user on a display 122 that displays a GUI 124 through which the user can view, manipulate, edit, etc., the graph of user profile data. Both the input device and output device may include fixed or removable storage media such as a magnetic computer disk, CD-ROM, or other suitable media to both receive input from and provide output to users of client 104A through the display 122, namely over GUI 124.

GUI 124 includes a graphical user interface operable to allow the user of client 104A to interface with at least a portion of system 100 for any suitable purpose, including viewing, manipulating, editing, etc., graphic visualizations of user profile data. Generally, GUI 124 provides the user of client 104 with an efficient and user-friendly presentation of data provided by or communicated within system 100. GUI 124 may comprise a plurality of customizable frames or views having interactive fields, pull-down lists, and buttons operated by the user. In one implementation, GUI 124 presents information associated with queries and buttons and receives commands from the user of client 104 via one of the input devices. Moreover, it should be understood that the terms graphical user interface and GUI may be used in the singular or in the plural to describe one or more graphical user interfaces and each of the displays of a particular graphical user interface. Therefore, GUI 124 contemplates any graphical user interface, such as a generic web browser or touch screen, which processes information in system 100 and efficiently presents the results to the user. Server 102 can accept data from client 104A via the web browser (e.g., Microsoft® Internet Explorer or Mozilla® Firefox) and return the appropriate HTML or XML responses using network 106. For example, server 102 may receive a request from client 104A using a web browser or application-specific graphical user interface, and then may execute the request to store and/or retrieve information pertaining to user profile data.

Figure 2:
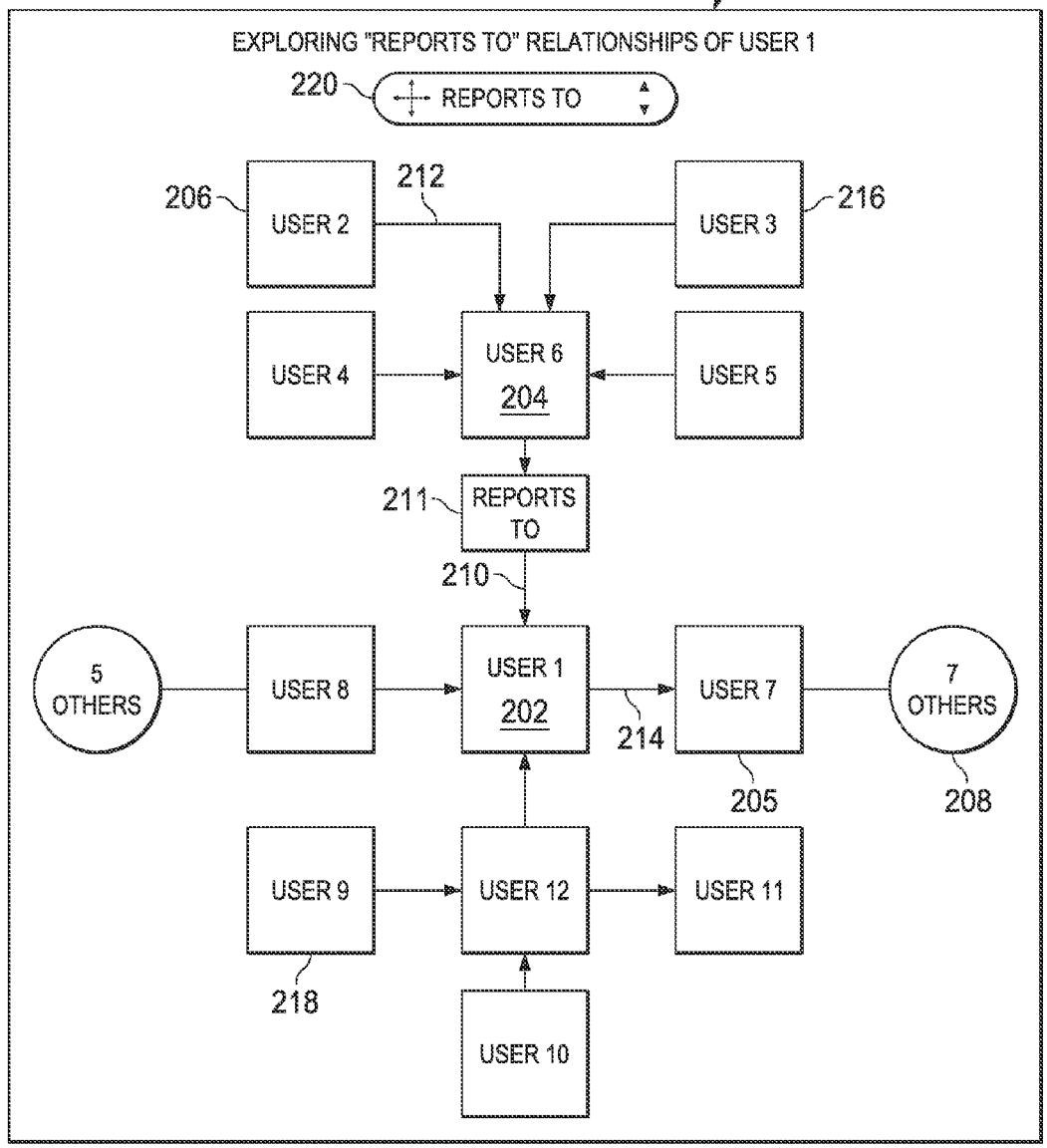
FIG. 2 is a schematic of an example graph illustrating a network of associations.

FIG. 2 shows an example graph of a graph visualization 200 of a network of associations. Graph 200 shows a graph of one example association for subject 202. In this case, the GUI provides for a list of associations as a pull-down menu 220, and graph 200 shows the "reports to" associations for subject 202. Subject 202 and his "reports to" associations are shown as an icon with a photograph thumbnail of the associates. The photograph thumbnail icon can be generated by the rendering engine 108, as shown in FIG. 1, from data received from the server storing the information used to generate the graph. The subject 202 and the associates are nodes of the graph, while the associations between the subject 202 and the associates are edges of the graph. The nodes and edges can each vary in size, color, strength (thickness, boldness, etc.), or other visual cues, depending on the relevancy, proximity, or other characteristic the associate or association has to the subject 202. Graph nodes represent different entities that take part in the current graph. Nodes are rendered in different visual cues for representing priority, frequency, relevancy, etc. For example, nodes can be dynamically rendered in different sizes and automatically scaled based on the screen dimensions, while maintaining proportions relative to other nodes for representing importance, priority, relevancy, etc. to the selected relation type(s). Furthermore, the user can "hover" over a node using a mouse pointer or other input interface device. Hovering over a node can reveal information about the node (discussed in more detail later). Nodes can be moved by the user using an input interface device, like a mouse or a finger touch or other input, on the graph interface to view node labels obscured by other nodes.

The example graph 200 graphically represents an organizational chart showing the reporting structure for subject 202. The subject 202 is the largest node, while first tier associates, such as associate 204 and associate 205, are second largest. The second tier of associates, such as associate 206, is third largest, and so on. The tiers, in this case, are based on the proximity to the subject 202 based on the organizational chart. That is, subject 202 is shown to have three immediate subordinates and one immediate superior. Both the subordinates and superiors are shown as the same size, though that can be adjusted based on user preferences. Some second tier associates 206 are also shown. Whether third tier associates are shown is also based on user preferences, and may be based on the available space on the view screen. To that end, certain associates can be clustered together to save space (shown as a clustered node 208). Clustered node 208 can be clustered automatically for nodes deemed less relevant for the selected relation type.

Furthermore, multiple relation types can be selected, so the graph can show associations for different relation types. For example, the "reports to" relation can be selected, as well as a "same committee membership" relation. The graph would show associates having a "reports to" relationship with subject 202 and associates sharing the same committee membership as subject 202. For this example, data for both sets of relationships can come from the same source; however, the relationships selected for graphing may come from different sources, and the graph would render the associations based on data retrieved from one or more sources. So the "reports to" relation can be selected and a "Facebook® friends" relation can be selected, and the rendering engine 108 would render the graph showing associations for both "reports to" and "Facebook® friends."

As shown in FIG. 2, among the associates, the connections and their relevance vary depending on their work relationship. For example, one commonality between associate 206 and associate 216 is that they both report to associate 204. In comparison, associate 206 and associate 218 do not report to the same person, and thus they do not possess the commonality of reporting to same person. Other commonalities among the associates may include their work location, expertise, involved projects, common friends, common communication, interests, etc. The strength of connection may also vary depending on the parameters of the connection. For example, as shown in FIG. 2, associate 204 has a total of 4 direct reports, so the connection between associates 206 and 216 is relatively strong as the number of people reporting to associate 204 is small (in other words, associates 206 and 216 work together in a small group, and the likelihood of their interaction is relatively high; whereas, if they were in a much larger group, the likelihood of their interaction would be lower). If the total number of direct reports of associate 204 later on increases to 100, the connection between associates 206 and 216 may turn into a relatively weak connection. In another example, associates 206 and 216 may have another connection between them, as they both attended the same conference in the same year. This connection may be strong if the total number of people in the organization attending the conference is relatively small, and the event of same conference occurred recently, whereas the connection may be weak if the majority of employees in the organization attended the conference, or the event of same conference occurred many years ago.

In another example, associates 206 and 218 may have a connection between them if both of them include associate 205 as a friend. Alternatively, a connection between associates 206 and 218 may exist if the majority of their friends are employed in the agriculture industry, or if they both had their latest communication with the same person, etc.

FIG. 3 shows an example of adaptive user profile presentation 300. A user profile data 305 associated with client 104A is stored at the server 102 (shown in FIG. 1). In this particular example, the user profile data 305 includes the user's professional affiliation 302 as a member of the IEEE communication society committee, the user's personal interest 304 as a member of the ABC tennis association, and the user's current XYZ project 306. Server 102 receives requests from clients 104B and 104C to view the user profile of client 104A. In some embodiments of the present disclosure, the requesting individual may be authenticated by the server 102 as a user of the public or enterprise social network, a member of a community, or other type of individual authorized by the user to access the user profile. The server 102 may retrieve the identity of the requesting individual and their associated user profiles from profile database 115.

The server 102 retrieves the requested user profile of client 104A, and identifies that both clients 104A and 104B are members of ABC tennis association. The identification of commonality may be completed by comparing the user profile data between clients 104A and 104B, by matching the user profile metadata between clients 104A and 104B, or by filtering out the distinct user properties between clients 104A and 104B. Other than the tennis association, no other commonality between clients 104A and 104B is identified in this particular example. As a result, the information of ABC tennis association 304 associated with client 104A is provided to client 104B through display 310. Other irrelevant information of client 104A, for example, the professional affiliation with IEEE communication society committee 302, or the XYZ project 306, is not shown to client 104B.

For the request from client 104C, the server 102 compares the user profiles between clients 104A and 104C, and identifies that both clients 104A and 104C are involved in XYZ project. Other than the XYZ project, no other commonality between clients 104A and 104C is identified in this particular example. Accordingly, the information of XYZ project 306A associated with client 104A is provided to client 104C through display 315. Other irrelevant information of client 104A, such as the professional affiliation with IEEE communication society committee 302, or the membership of ABC tennis association is not shown to client 104C. As illustrated in FIG. 3, the information of the user profile associated with client 104A is presented dynamically to clients 104B and 104C based on the identified commonalities among the users. In the above example, if more than one commonality is identified between clients 104A and 104B or between clients 104A and 104C, all or some relevant commonalities may be presented to the clients 104B or 104C.

For this example, user profile data for clients 104A-C can come from the same source; however, the user profile data may come from different sources, and the profile processing module 126 would render the user profile information based on data retrieved from one or more sources. In some embodiments of the present disclosure, the server may retrieve other related information of the owner of the profile from other sources outside of the profile database 115, and present the related information to the requesting individual. For instance, in response to the request from client 104C to view the user profile of client 104A, the server 102 may pull out additional documents related to project XYZ from the intranet of the organization, and provide them to client 104C. In other words, the server is not constrained to only present user information stored in the user profile database. The server may retrieve other relevant user information associated with the owner of the user profile from other sources, and provide the relevant information to the requesting individual. The additional information may be retrieved from multiple sources by the server. For example, further information relevant to the IEEE communication society committee of the client 104A may be acquired from source S1, while further information relevant to the ABC tennis association may be acquired from source S2. The server may have a pre-configured list of sources that the server may request further information from.

Figure 4:
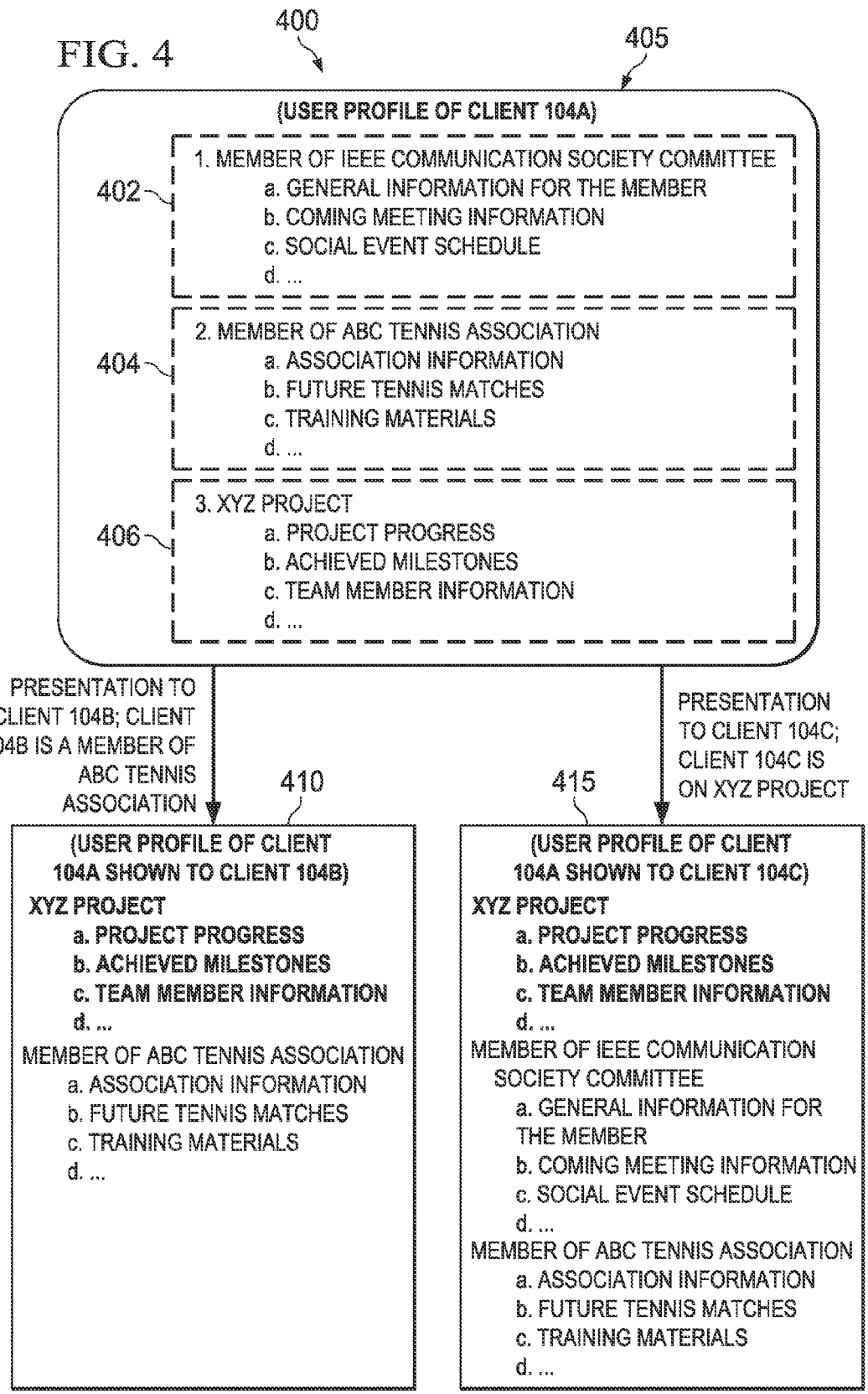
FIG. 4 is an example of an alternative user profile presentation organized according to commonalities and their associated strength among the users.

FIG. 4 illustrates another example of a dynamic user profile presentation 400 based on the commonalities among users and their strength. In particular, user profile information is prioritized and provided to the requesting individuals. In this example, clients 104B and 104C both request for user profile information of client 104A. User profile of client 104A 405 includes the user's professional affiliation 402, personal interest 404, and current work project 406. Client 104B is involved with project 406, and client 104B happens to be a member of the same tennis association as client 104A. Specifically, the total number of people involved in project 406 is 10, and the total number of people in the ABC tennis association is about 100 in the network. Server 102 identifies the commonalities between clients 104A and 104B. Further, server 102 determines the connection strength for each commonality based on other available parameters, such as the total number of people having the commonality, importance of the commonality, occurring date of the commonality, etc. Accordingly, server 102 determines that the XYZ project 406 is a stronger connection between clients 104A and 104B than the tennis association 404. As a result, in the provided user profile 410, server 102 presents XYZ project 406 of client 104A to client 104B with higher priority, and presents ABC tennis association of client 104A to client 104B with lower priority.

Likewise, server 102 determines priority among the identified commonalities between clients 104A and 104C, and provides the commonalities to client 104C based on the priority. In this example, client 104C is identified to be involved in the same professional affiliation, tennis association and work project as client 104A. Specifically, the total number of people involved in the same professional affiliation is 50, the total number of people involved in project 406 is 10, and the total number of people in the ABC tennis association is about 100 in the network. Server 102 determines that XYZ project has the highest priority among the commonalities, the IEEE communication society committee has the intermediate priority among all the commonalities, and the ABC tennis association has the lowest priority among all the commonalities. Consequently, in the provided user profile 415, server 102 presents to client 104C first the XYZ project, secondly the IEEE communication society committee, and lastly the ABC tennis association.

Figure 5:
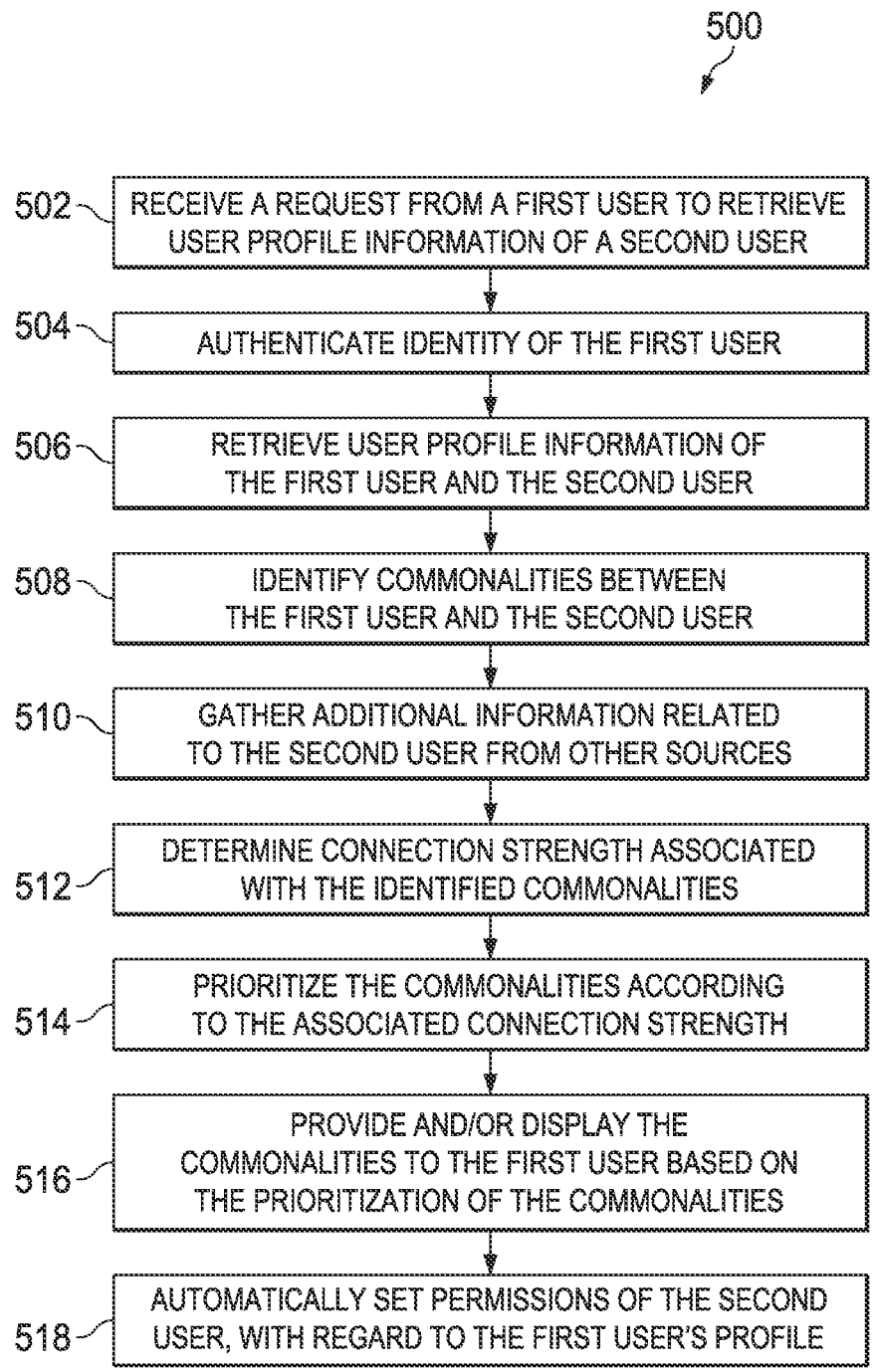
FIG. 5 is a process flow diagram for providing dynamic user profile presentation.

FIG. 5 illustrates an example of process flow chart 500 for providing dynamic user profile presentation in a social network. A request from a first user to retrieve user profile information of a second user can be received at a server (502). The server may authenticate the identity of the first user (504). Subsequently, the server starts to retrieve user profile information for both the first user and the second user (506). The server may identify certain commonalities between the first user and the second user (508). The commonalities may be identified from all possible social connections and common user properties between the first user and the second user. The commonalities may also be identified from other sources of common knowledge and activities, such as latest common communication, latest common meetings, etc. Further, the server may gather additional related information of the second user from other sources, which is not contained in the user profile of the second user (510). For example, the additional information may be collected by a software agent installed on the second user's client machine or gathered by the application server itself. For example, the additional information may include documents, reports, or schedule related to the second user's work project. Information may also be from enterprise resource planning, customer relation management, supplier relationship management software, social graph rules, and/or business analytics systems.

Furthermore, the server may derive additional information based on the commonalities. For instance, the server may derive that the first user and second user live in the same town if they share the same zip code, and then provide this common location information to the first user. The additional information is extracted as it is correlated to one of the identified commonalities between the first user and the second user, and it may be of potential interest to the first user. The commonality and additional related information may comprise public information and non-public information which is accessible to a selected group of users. The non-public information is accessible to the first user due to the correlation of the contents to the first user.

The server may then determine the connection strength associated with the identified commonalities (512). The connection strength may be an indicator of the interaction frequency between the first user and the second user resulting from the associated commonality. Connection strength of the identified commonalities may be calculated based on a variety of parameters associated with the commonalities, such as number of other users possessing the same commonalities, occurrence dates of the commonalities, importance of the commonalities, etc. The server may prioritize the commonalities according to the associated connection strength (514). The commonality with the strongest connection strength may be listed with the highest priority, and the commonality with the least connection strength may be listed with the lowest priority. The server then provides and/or displays the commonalities to the first user in accordance with the prioritization of the commonalities (516). The commonality with high priority may be shown to the first user at a more notable position in the display screen, and the commonality with low priority may be shown to the first user at a less notable position in the display screen. In some embodiments of the present disclosure, only partial contents associated with the commonality with low priority may be presented to the first user. The whole contents associated with the low priority commonality may not be presented unless the first user requests for the information explicitly.

For some contents of the user profile, the second user may wish to restrict the access to specific groups or individuals. The process of manually setting the permissions may be time-consuming and inconvenient for the second user. Instead of the second user manually setting the permission or privacy level for the first user, the server may automatically set access permissions for the first user, with regard to accessing the user profile of the second user, based on the identified commonalities between the first user and second user (518). As a result, non-public contents associated with identified commonalities may be presented to the first user. On the other hand, non-public contents not identified as commonalities may not be presented to the first user. The second user would not need to manually turn on the permission to allow or to restrict the second user to view the non-public contents.

A number of embodiments of the disclosure have been described. Nevertheless, it will be understood that various modifications may be made without departing from the spirit and scope of the disclosure. Accordingly, other embodiments are within the scope of the following claims.

What is claimed is:

1. A computer-implemented method for dynamic user profile presentation, comprising:
   receiving a request from a first user to view profile information of a second user;
   identifying a first set of commonalities between profile information of the first user and the profile information of the second user; and
   dynamically generating a first version of the profile information of the second user for presentation to the first user, the first version of the profile information generated in response to and after receiving the request from the first user, the first version based on the identified first set of commonalities, wherein the first version of the profile information is not stored or generated prior to receiving the request from the first user;
   receiving a request from a third user to view profile information of the second user, the third user different than the first user;
   identifying a second set of commonalities between profile information of the third user and the profile information of the second user, the second set of commonalities different than the first set of commonalities; and
   dynamically generating, a second version of the profile information of the second user for presentation to the third user, the second version of the profile information generated in response to and after receiving the request from the third user, the second version based on the identified second set of commonalities, wherein the second version of the profile information is different than the first version of the profile information, and wherein the second version of the profile information is not stored or generated prior to receiving the request from the third user.

2. The method of claim 1, wherein the profile information of the second user is stored in a memory.

3. The method of claim 2, further comprising:
   retrieving the profile information of the second user from the memory; and
   displaying the retrieved information to the first user.

4. The method of claim 1, wherein the commonalities between the first and second user include one or more of common social connections, common user property, common interests, and common activities.

5. The method of claim 1, further comprising:
   determining connection strength associated with the identified first set of commonalities; and
   prioritizing the commonalities according to the associated connection strength.

6. The method of claim 5, wherein determining connection strength is calculated based on a plurality of parameters associated with the identified first set of commonalities, and the plurality of parameters include one or more of a number of other users possessing same commonalities, occurrence dates of the commonalities, and importance of the commonalities.

7. The method of claim 5, wherein the connection strength is an indicator of the interaction frequency between the first user and the second user resulting from the associated commonality.

8. The method of claim 5, further comprising:
providing the commonalities to the first user based on the prioritization of the commonalities.

9. The method of claim 1, further comprising:
automatically setting permissions for the first user to access profile information of the second user, based on the identified first set of commonalities.

10. The method of claim 1, further comprising:
gathering additional information of the second user from sources other than a user profile database; and
providing the additional information to the first user.

11. The method of claim 1, wherein the commonalities include non-public information, which is accessible to a selected group of users.

12. The method of claim 1, further comprising:
receiving requests from a plurality of users for profile information of the second user;
identifying commonalities between each of the plurality of users and the second user; and
providing the commonalities between each of the plurality of users and the second user to each of the plurality of users, respectively.

13. A computer program product, tangibly embodied in a non-transitory, machine-readable storage device, the computer program product being operable to cause data processing apparatus to perform operations comprising:
receiving a request from a first user to view profile information of a second user;
identifying a first set of commonalities between profile information of the first user and the profile information of the second user; and
dynamically generating a first version of the profile information of the second user for presentation to the first user, the first version of the profile information generated in response to and after receiving the request from the first user, the first version based on the identified first set of commonalities, wherein the first version of the profile information is not stored or generated prior to receiving the request from the first user;
receiving a request from a third user to view profile information of the second user, the third user different than the first user;
identifying a second set of commonalities between profile information of the third user and the profile information of the second user, the second set of commonalities different than the first set of commonalities; and
dynamically generating a second version of the profile information of the second user for presentation to the third user, the second version of the profile information generated in response to and after receiving the request from the third user, the second version based on the identified second set of commonalities, wherein the second version of the profile information is different than the first version of the profile information, and wherein the second version of the profile information is not stored or generated prior to receiving the request from the third user.

14. The product of claim 13, wherein the profile information of the second user is stored in a memory.

15. The product of claim 14, further comprising: retrieving the profile information of the second user from the memory; and displaying the retrieved information to the first user.

16. The product of claim 13, wherein the commonalities between the first and second user include one or more of common social connection, common property, common knowledge and activity.

17. The product of claim 13, further comprising:
determining connection strength associated with the identified first set of commonalities; and
prioritizing the commonalities according to the associated connection strength.

18. The product of claim 17, wherein determining connection strength is calculated based on a plurality of parameters associated with the identified first set of commonalities, and the plurality of parameters include one or more of a number of other users possessing same commonalities, occurrence dates of the commonalities, and importance of the commonalities.

19. The product of claim 17, wherein the connection strength is an indicator of the interaction frequency between the first user and the second user resulting from the associated commonality.

20. The product of claim 13, further comprising:
providing the commonalities to the first user based on the prioritization of the commonalities.

21. The product of claim 13, further comprising:
automatically setting permissions for the first user to access profile information of the second user, based on the identified first set of commonalities.

22. The product of claim 13, further comprising:
gathering additional information of the second user from sources other than a user profile database; and
providing the additional information to the first user.

23. The product of claim 13, wherein the commonalities include non-public information, which is accessible to a selected group of users.

24. The product of claim 13, further comprising:
receiving requests from a plurality of users for profile information of the second user;
identifying commonalities between each of the plurality of users and the second user; and
providing the commonalities between each of the plurality of users and the second user to each of the plurality of users, respectively.

* * * * *